United States Patent [19]

Isenga et al.

[11] Patent Number: 5,423,508
[45] Date of Patent: Jun. 13, 1995

[54] FOLDABLE SUPPORT FOR BEVERAGE CONTAINER

[75] Inventors: Steven R. Isenga, Zeeland; James H. Miller, Holland, both of Mich.

[73] Assignee: ITC, Incorporated, Zeeland, Mich.

[21] Appl. No.: 134,066

[22] Filed: Oct. 12, 1993

[51] Int. Cl.[6] .............................................. A47K 1/08
[52] U.S. Cl. ............................... 248/311.2; 224/42.44; 224/42.45 R; 248/313
[58] Field of Search .................. 248/311.2, 313, 316.5; 224/42.45 R, 42.44, 42.42; 211/71; 297/194

[56] References Cited

U.S. PATENT DOCUMENTS

| | | | |
|---|---|---|---|
| 4,530,480 | 7/1985 | Pratt | 248/311.2 |
| 4,645,157 | 2/1987 | Parker | 248/311.2 |
| 4,828,211 | 5/1989 | McConnell et al. | |
| 4,984,722 | 1/1991 | Moore | 224/42.45 R |
| 5,072,909 | 12/1991 | Huang | 248/311.2 |
| 5,167,392 | 12/1992 | Henricksen | 248/316.5 |
| 5,259,579 | 11/1993 | Schneider | 248/311.2 |
| 5,297,709 | 3/1994 | Dykstra | 224/42.44 X |
| 5,297,767 | 3/1994 | Miller | 248/313 |
| 5,318,266 | 6/1994 | Liu | 248/311.2 |
| 5,328,143 | 7/1994 | Koorey | 224/42.45 R X |
| 5,330,146 | 7/1994 | Spykerman | 297/194 |

Primary Examiner—J. Franklin Foss
Attorney, Agent, or Firm—Flynn, Thiel, Boutell & Tanis

[57] ABSTRACT

A holder for beverage containers has a back panel flanged for flush mounting on an upstanding support surface and a pivoting base panel and clamp member pivotable between forward extending use positions wherein they can support and grip a beverage container, and a folded non-use position. Movement between these positions is resiliently resisted by a generally square pin-in-hole connection surrounded by circumferentially spaced slots spaced from corresponding edges of the holes by thin, resiliently bendable, leaves deflectable by corners on the pins.

18 Claims, 9 Drawing Sheets

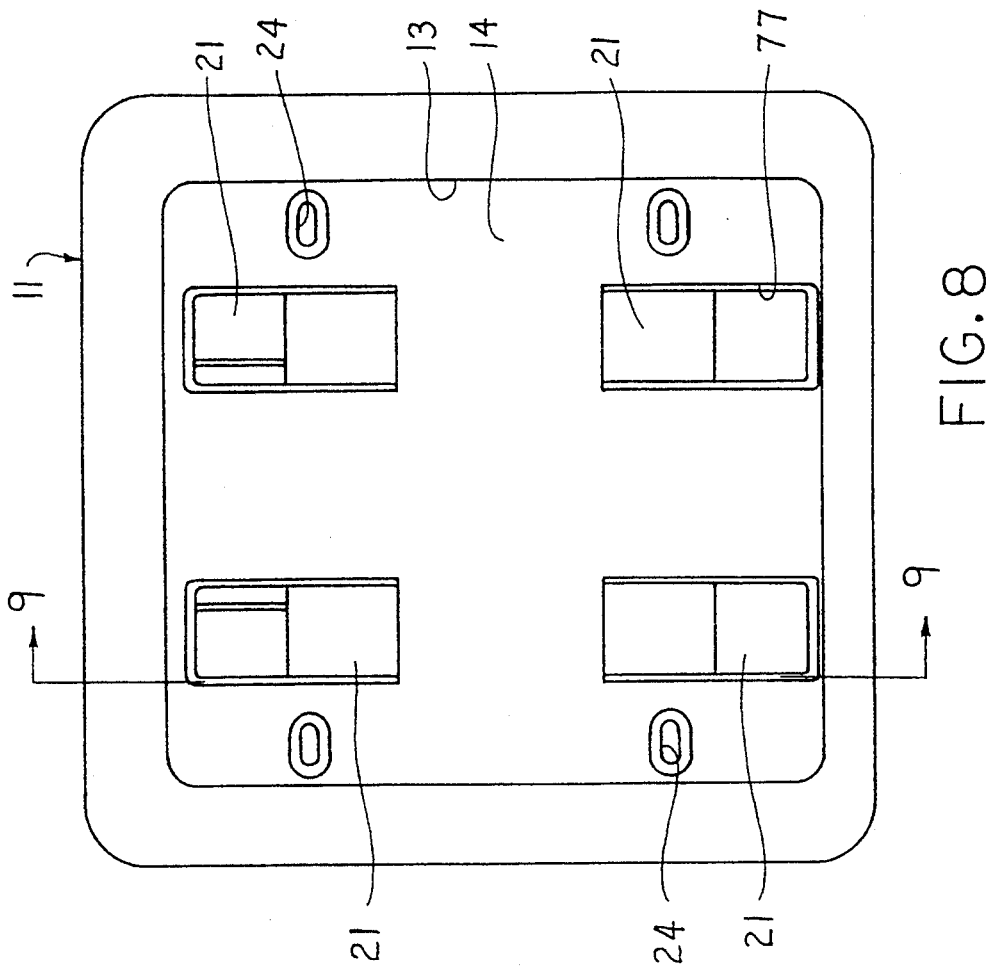
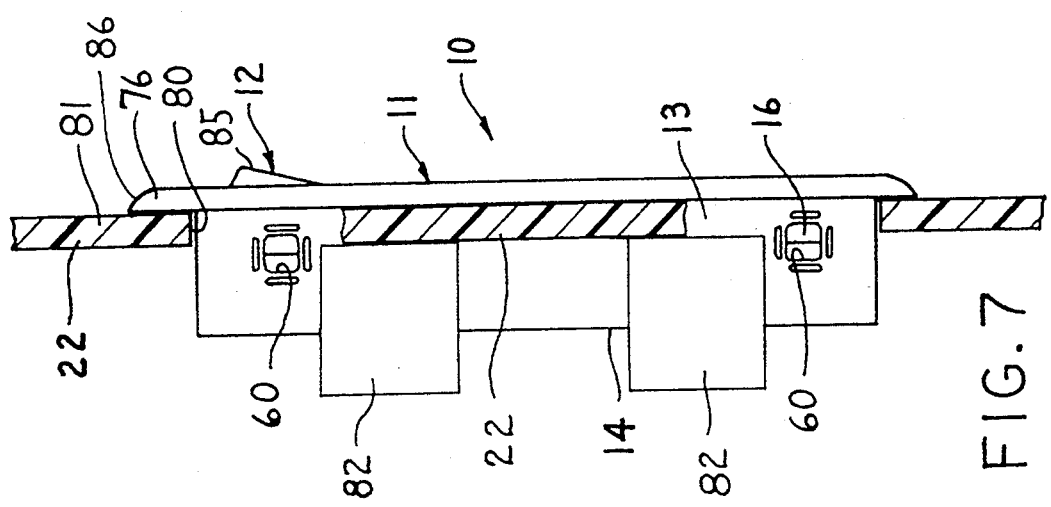

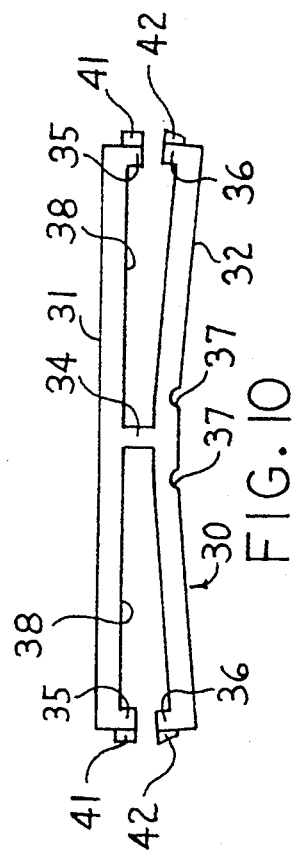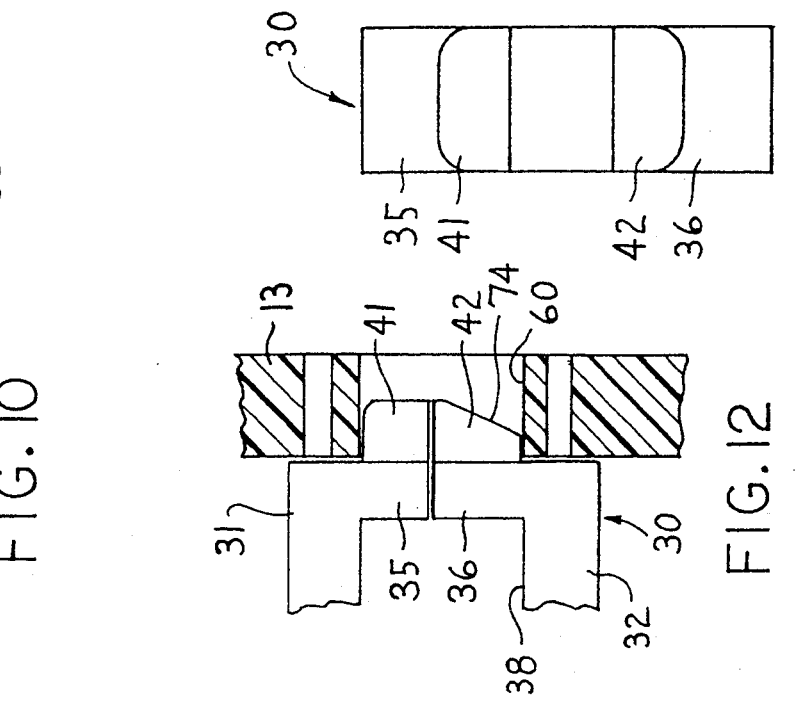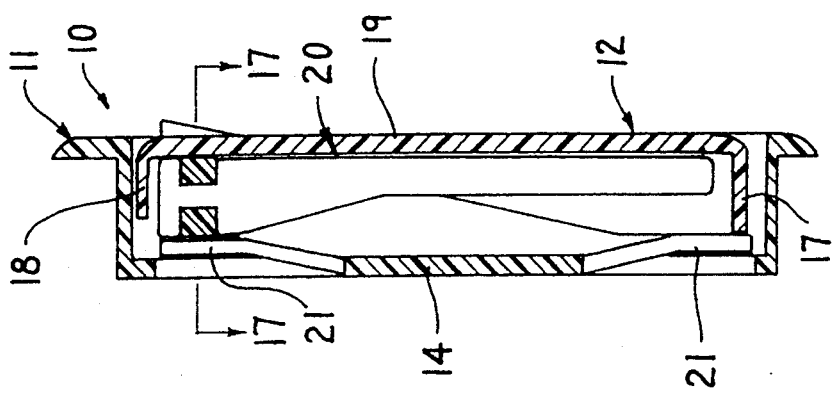

FOLDABLE SUPPORT FOR BEVERAGE CONTAINER

FIELD OF THE INVENTION

This invention relates to a holder for holding items, such as a beverage container, in a steady but removable and replaceable manner, on a moving vehicle or vessel, and particularly to such a holder which folds out of the way when not in use.

BACKGROUND OF THE INVENTION

U.S. Pat. No. 4,828,211 (McConnell and Isenga) was issued May 9, 1989 and is assigned to the assignee of the present invention. This patent discloses a holder for beverage containers and the like for steadily, but removeably and replaceably, supporting such a beverage container in a vehicle or vessel, despite fore and aft or sideways rocking motion, so as to prevent spilling of the contents of the beverage container when the vehicle or vessel is underway. This prior holder is mountable on an upwardly extending surface, such as a bulkhead or a cockpit sidewall of a boat, for holding a beverage container in a convenient location. Such prior holder is foldable into a relatively compact box-like configuration so as to protrude less far from the supporting surface of the vehicle or vessel when not in use. The prior holder has a back panel adapted to seat against and be supported by the upwardly extending surface of the vehicle or vessel, and provided along its lower edge with a pivot connection for a base panel. Thus, the base panel can be folded up to close the holder and folded down to a horizontal position to support the bottom of a beverage container. In addition, the back panel has a pivot connection along its upper edge for a clamp member which extends forwardly substantially horizontally from the back panel and is width adjustable for gripping the mid or upper portion of a beverage container to prevent sideways displacement or tilting of such beverage container, while yet permitting the beverage container to be plucked upwardly out of contact with the holder for drinking. This upper pivot connection permits the empty clamp member to be pivoted downward against the back panel and subsequently covered by upward pivoting of the base panel to establish the folded condition of the holder. Vertically extending, metal leaf springs extend substantially the height of the back panel and have centers fixed to the front face thereof by rivets. The springs have lower ends bearing on the back portion of the base panel and upper ends bearing on the back portion of the clamp member for resilient deflection to permit the user to fold and unfold the base panel and clamp member with respect to the back panel, but to otherwise resiliently keep the base panel and clamp member in their respective folded (closed) positions and forwardly extending, substantially horizontal (use) positions. Pivoting of the base panel with respect to the back panel is by coaxial, circular cross-section pins protruding laterally outward from opposite sides of the back portion of the back panel and pivotly received in corresponding coaxial, circular cross-section holes in corresponding laterally spaced sides of the base panel adjacent the bottom edge thereof. Similarly, the clamp member has coaxial, effectively circular cross-section pins laterally extending from opposite lateral ends thereof and pivotly received in corresponding circular cross-section holes in the top portion of a forwardly extending flange at opposite lateral edges of the back panel. The effective circular cross-section pins of the clamp member are each formed by a diametrically split pin defined by semi-circular cross-section half pins extending laterally from the ends of an H-shaped base of the clamp member and which, when installed in the finished holder, come diametrically together to effectively form a circular cross-section pin.

This prior foldable beverage container holder has proved to be functionally and commercially advantageous. However, in a continuing effort to improve same, the present invention has been developed. The present invention is thus intended to improve the prior device disclosed in aforementioned U.S. Pat. No. 4,828,211 in several respects.

SUMMARY OF INVENTION

An article holder mountable on an upwardly extending surface, said holder comprising a back panel adapted to be fixed with respect to an upwardly extending surface, a base panel moveable with respect to said back panel between an open position extending outwardly from said back panel and a closed position overlying said back panel, a clamp member for engaging and holding a beverage container, said clamp member being moveable with respect to said back panel for pivotal movement between a storage position between the closed base panel and back panel and an erected position extending outwardly from said back panel and spaced from the open position of said base panel, hinge means for pivotly supporting a moveable member with respect to said back panel, said moveable member constituting at least of one of said base panel and clamp member, said hinge means comprising a pin-rotatable-in-hole means for pivotally supporting said moveable member with respect to said back panel, said pin-rotatable-in-hole means comprising pin means on one of said moveable member and back panel and hole means on the other of said moveable member and back panel, at least one of said pin means and hole means having means associated therewith and interactive with the other of said pin means and hole means for positively holding said moveable member in a first position with respect to said back panel and for resiliently distorting in response to forcible manual urging of said moveable member with respect to said back panel in a pivoting direction about a rotational axis of said pin means with respect to said hole means for permitting pivoting of said moveable member out of said first position and toward a second position with respect to said back panel.

Other objects and purposes of the invention will be apparent to persons acquainted with apparatus of this general type upon reading the following description and inspecting the accompanying drawings.

BRIEF DESCRIPTION OF THE DRAWINGS

FIG. 7 is a side view substantially taken on the line 7—7 of FIG. 6.

FIG. 8 is a front elevational view of the back panel of the FIG. 1 apparatus.

FIG. 9 is a cross-sectional view substantially taken on the line 9—9 of FIG. 8 and similar to FIG. 4 but showing the holder in a closed condition.

FIG. 10 is a front elevational view of the track element of the clamp member of FIG. 4.

FIG. 11 is an enlarged right end view of the FIG. 10 track element.

FIG. 12 is an enlarged fragment of the FIG. 10 track element with its legs and pin halves pressed together and pivotly received in an opening in the adjacent side of the back member of FIG. 8.

FIG. 15 is an enlarged fragment of FIG. 7 showing the hinge connection of the clamp member to the back panel, the hinge connection of the base panel to the back panel being similar.

DETAILED DESCRIPTION

Figure 1:
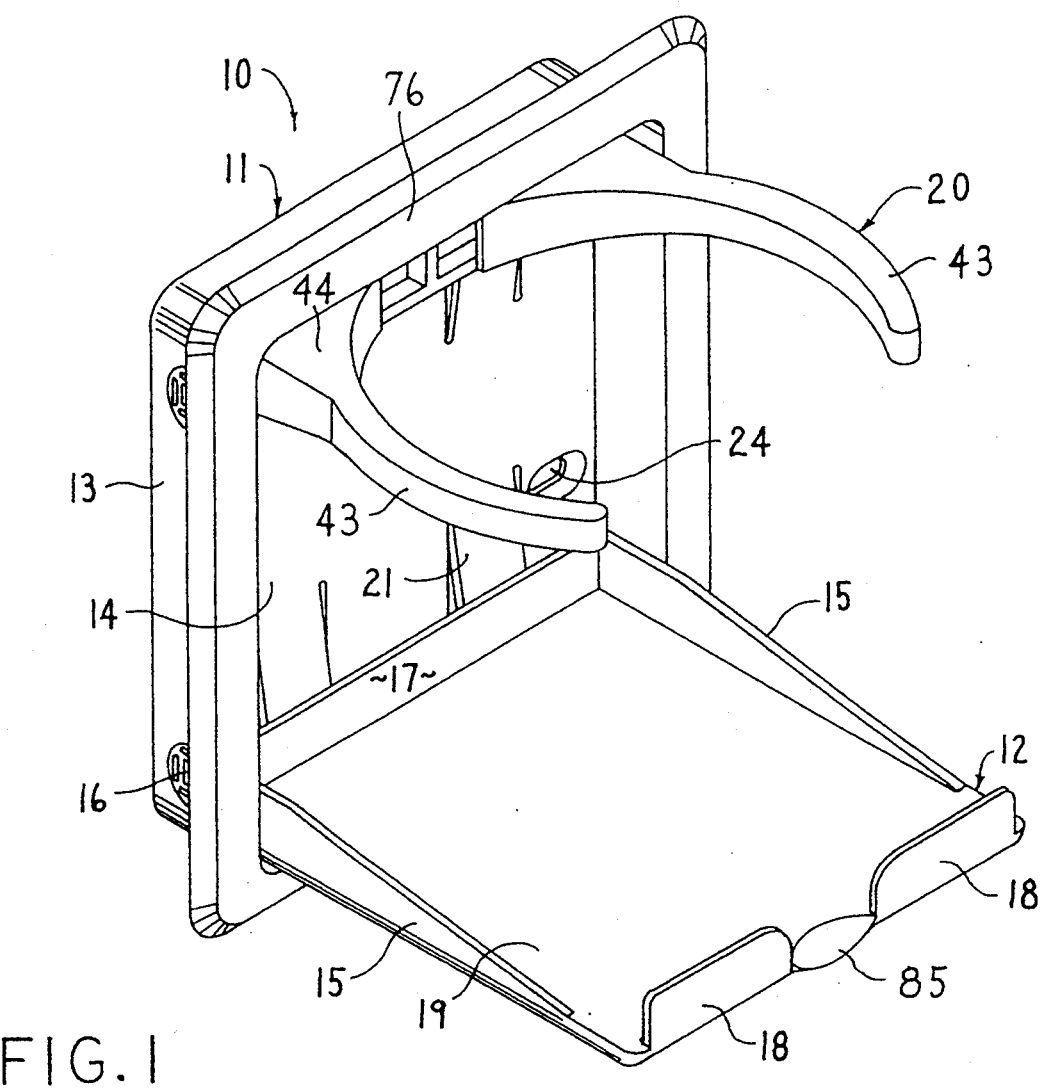
FIG. 1 is a pictorial view of an article holder embodying the invention, in an open position, for holding a beverage container.

A holder 10 (FIG. 1) comprises a back panel 11 having a pair of upstanding, laterally opposed sides 13 which extend forward from a upstanding back wall 14. A base panel 12 has laterally opposed sides 15 which, adjacent the back edge portion, are pivoted to adjacent sides 13 of the base panel by hinge pins 16 (FIG. 7). The base panel 12 is pivotable on the back panel 11, by means of the hinge pins 16, from an open, or beverage container support, position (FIGS. 1-4) to a closed position (FIGS. 6 and 7) substantially flush with the front face of the base panel 12. As seen in its FIG. 1 open position, the base panel 12 has a shallow, upwardly open, generally box-like shape with upstanding, laterally extending back and front flanges 17 and 18 fixed along the back and front edges thereof, between the sides 15, and an upfacing front wall 19 joining the bottom edges of the sides 15 and flanges 17 and 18.

A clamp member 20 is pivotally supported near the upper end of the back panel 11, (as seen in FIG. 1) for pivoting between a forwardly extending, erected position (FIGS. 1 and 4) and downwardly extended, storage position within the back panel 11, between the back wall 14 thereof and the front wall 19 of the closed base panel, or cover, 12.

Figure 5:
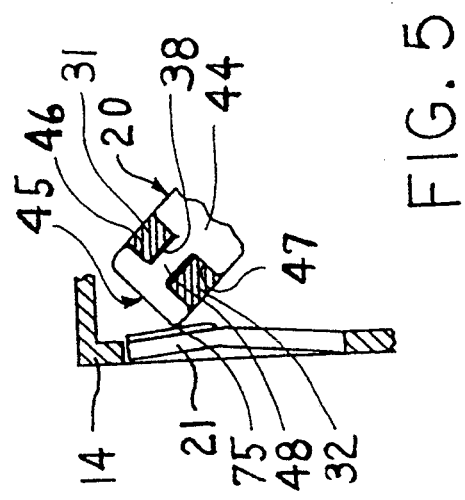
FIG. 5 is an enlarged fragment of FIG. 4 showing the clamp member in a position intermediate its storage and erected positions.
Figure 4:
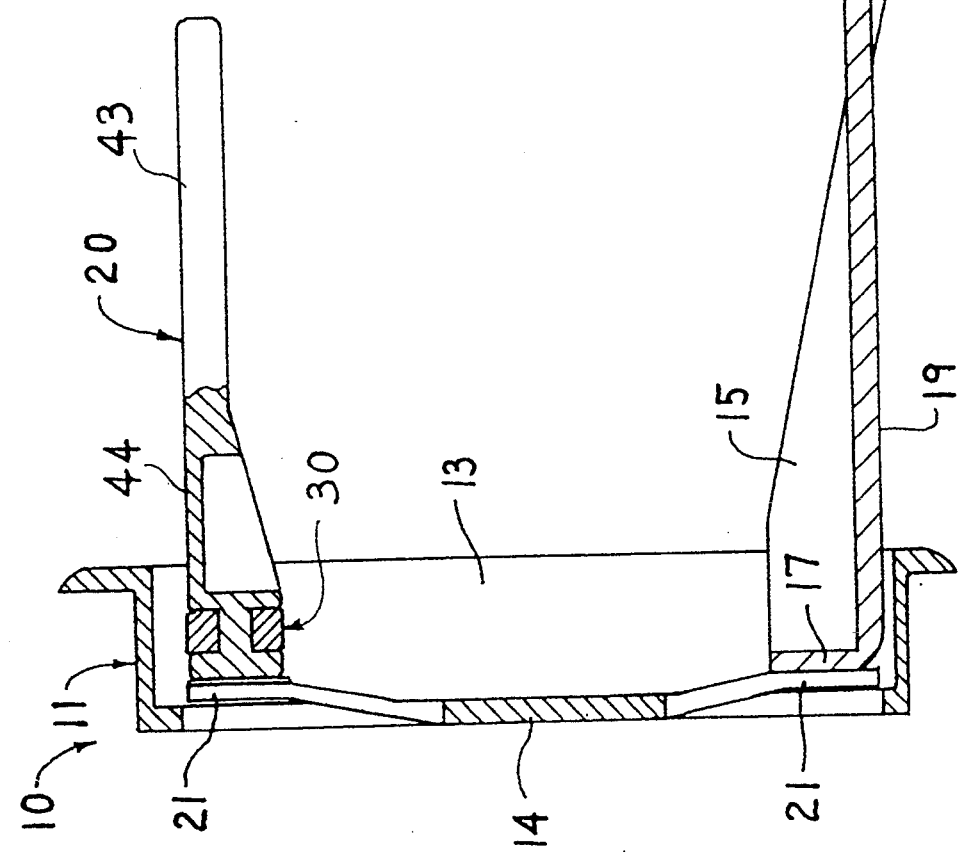
FIG. 4 is a sectional view substantially taken on the line 4—4 of FIG. 2.

Leaf spring-like elements 21 have upper and lower portions located slightly forwardly of the back wall 14 of the back panel 11 (as seen in FIGS. 1 and 4) to resiliently bear forwardly against the back flange 17 of the base panel 12 and against the back portion of the clamp member 20 to resiliently hold the base panel 12 and clamp member 20 in their forwardly extending, use positions shown in FIGS. 1 and 4 and in their folded positions of FIG. 9. Pivotal movement of the base panel 12 and clamp member 20 between their use and folded positions, as shown in FIG. 5 with respect to clamp member 20, is resiliently resisted by rearward bending of the leaf spring-like elements 21. The leaf spring-like elements 21 thus contribute to stable positioning of the base member 12 and clamp member 20 in their FIG. 4 and FIG. 9 positions by resiliently resisting movement thereof between those positions.

Figure 17:
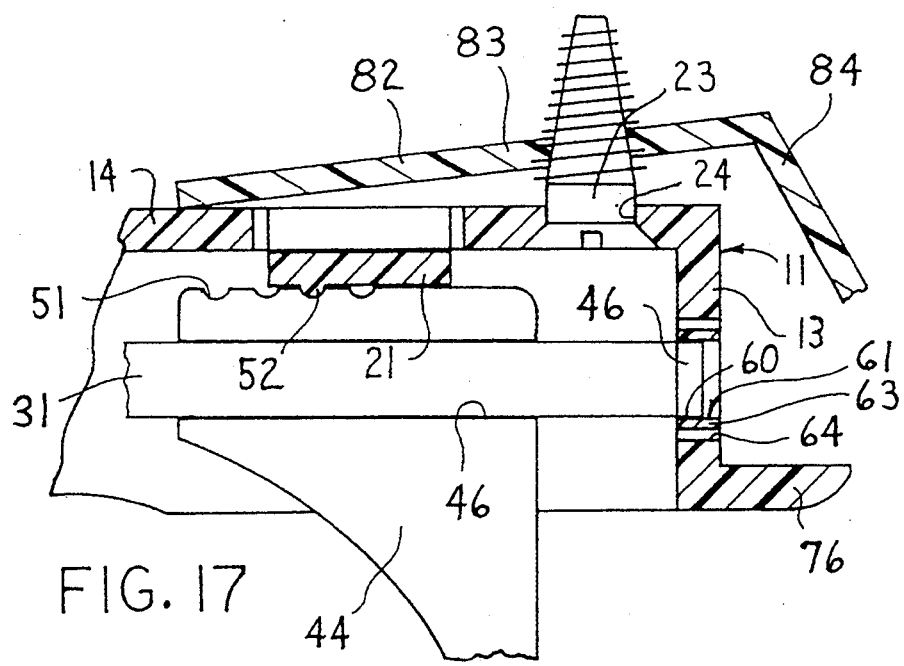
FIG. 17 is an enlarged fragmentary sectional view substantially taken on the line 17—17 in FIG. 9.

The back panel 11 may be fixedly mounted on a vertical supporting surface 22, of a vehicle or vessel, such as a bulkhead of a boat, by means of screws or bolts 23 extending rearward through countersunk holes 24 in the back wall 14 of the base panel 12, as generally indicated in FIG. 17 and as hereafter further discussed. Preferably several such holes 24 are provided in the back wall 14, for example as seen in FIG. 8.

The clamp member 20 comprises a generally H-shaped member 30 (FIGS. 10 and 11). The H-shaped member 30 has a generally straight first bar 31 and an opposed second bar 32. A short, integral bight 34 rigidly connects the central portions of the first and second bar. The end portions of the second bar bend resiliently away from the end portions of the first bar. The ends of the second bar have stubs 35 which extend toward corresponding stubs 36 on the ends of the second bar. The stubs 35 and 36 each fixedly carry laterally outwardly extending half pins 41 and 42 respectively. Shallow notches 37 in the bottom of the second bar 32, on opposite sides of the bight 34, allow bending of the second bar 32 toward the straight bar 31, so that the stubs 35 and 36 and half pins 41 and 42 come together as shown in FIG. 12, thereby defining a laterally elongate, rectangular guide opening 38 on each side of the bight 34 and extending laterally out to the rightward and leftward (FIG. 10) stub pairs 35, 36.

The half pins 41 and 42 when brought together as in FIG. 4 form a composite pin 41, 42 preferably similar in size and shape preferably to the pins 16 of the base panel. The clamp member 20 and base panel 12 are pivoted on sides 13 of the back panel by respective pin-rotatable-in-hole connections.

Figure 2:
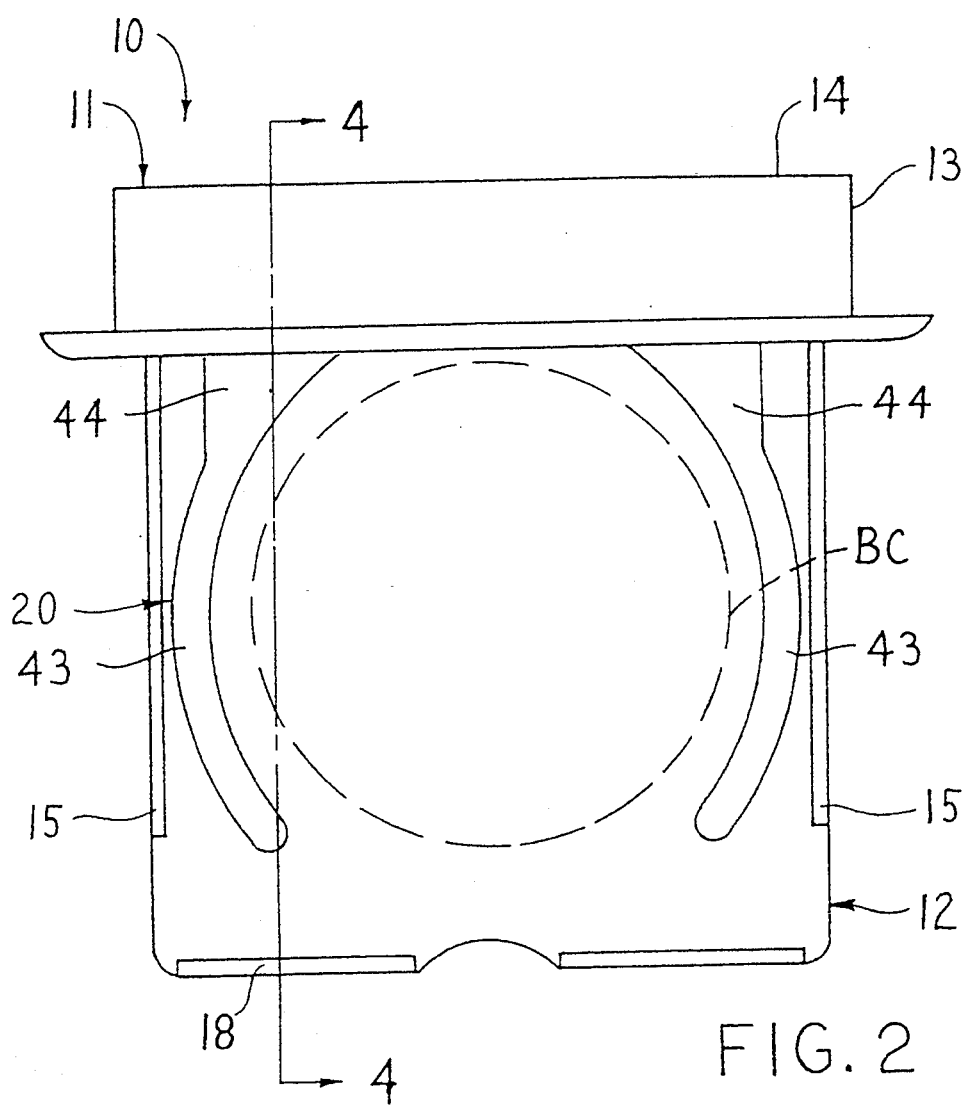
FIG. 2 is a top plan view of the FIG. 1 apparatus with the clamp member positioned for holding a smaller beverage container.
Figure 3:
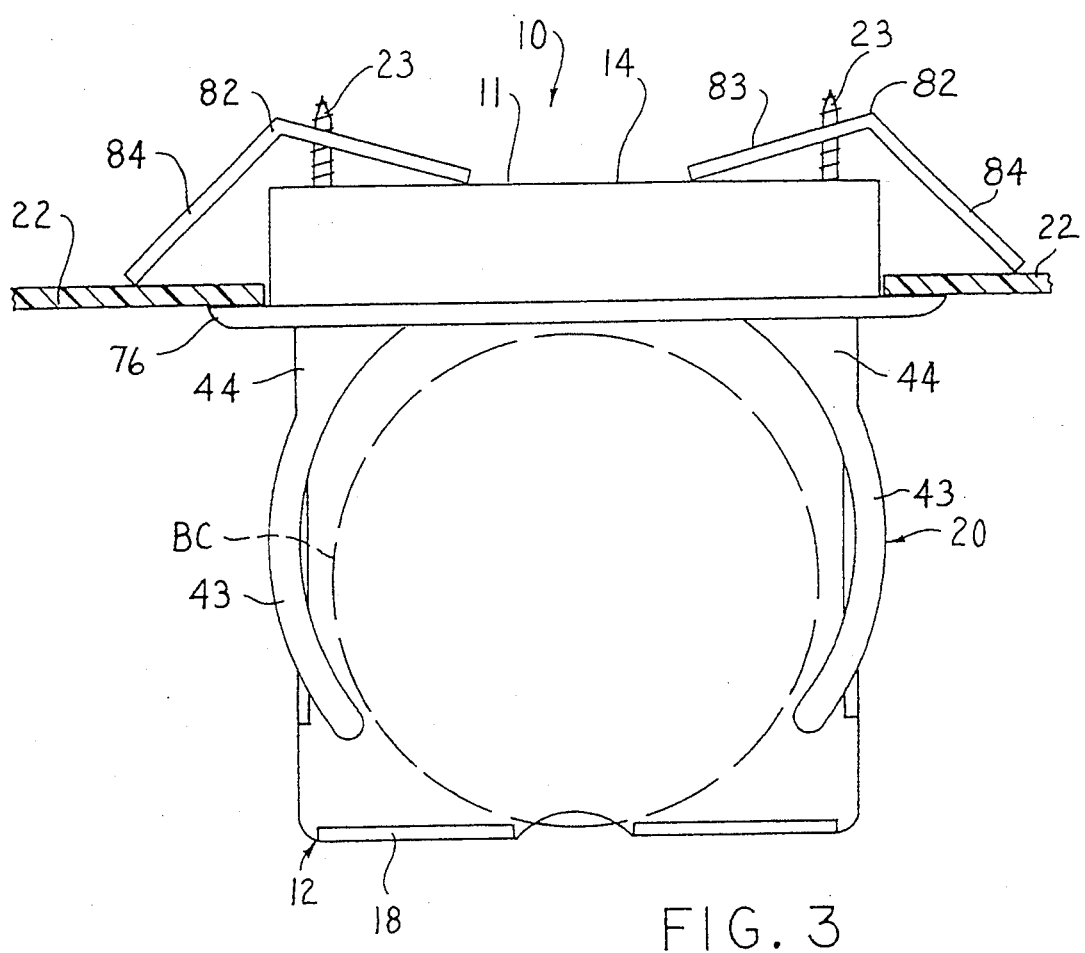
FIG. 3 is a view similar to FIG. 2 with the clamp member spread for holding a larger beverage container.

The clamp member 20 comprises a pair of arms 43 (FIGS. 1-3) which are laterally opposed to each other and open concavely toward each other to grasp a beverage container BC shown in dotted lines in FIGS. 2 and 3. Each arm 43 has a block-like rear mounting portion 44, the rear edge portion of which is defined by a generally H-cross-section yoke 45 (FIG. 5) defined by top and bottom grooves 46 and 47 separated by a web 48. The grooves 46 and 47 and web 48 extend laterally. The H-cross-section yokes 45 of such arms 43 are laterally slideably carried by corresponding sides of the H-shaped member 30. More particularly, the H-cross-section yoke 45 of each arm is slidable laterally into the respective open guide opening 38 of the H-shaped member 30, through the gap seen in FIG. 10 between the spaced stubs 35 and 36. Thus, upon bending upward of the second (lower in FIG. 10) bar 32 of the H-shaped member, the corresponding yoke 45 of the corresponding arm 43 is trapped in the corresponding guide opening 38, for movement laterally therein between the respective narrow and wide arm positions of FIGS. 2 and 3. More particularly, the bars 31 and 32 occupy the top and bottom grooves 46 and 47 of the yoke 45 for guiding adjustment of the two arms 43 toward and away from each other along the H-shaped member 30.

The back of each erected arm 43 incorporates several laterally spaced vertical grooves 51 (FIG. 17) for interacting with the leaf spring-like element 21 therebehind for resiliently locking the corresponding arm in a desired lateral position such as the closed and open positions shown in FIGS. 2 and 3 or in one or more desired position therebetween. To this end, a forward protrusion 52 (FIG. 17), on the portion of the leaf spring-like elements 21 behind the yoke 45 of each arm 43, interacts with the corresponding grooves 51 thereon in a resilient detent-like manner to determine several fixedly located, resiliently alternate positions for the respective arm, so that the arms 43 can be shifted between and, indeed, located between their FIG. 2 and FIG. 3 positions.

To the extent above described, the apparatus is similar to that disclosed in prior U.S. Pat. No. 4,828,211, assigned to the assignee of the present invention.

Attention is now directed to aspects of the disclosed device more centrally relating to the present invention.

The upstanding back panel sides 13, near the top and bottom thereof, are pierced by pivot holes 60 (FIGS. 7 and 15–17). The pivot holes 60 are multi-sided, here four sided with preferably flat, top, bottom and laterally opposed side edges 61 arranged so that each pivot hole 60 is substantially square, except for corners 62 preferably rounded for reasons of strength as hereinafter apparent.

Figure 15:
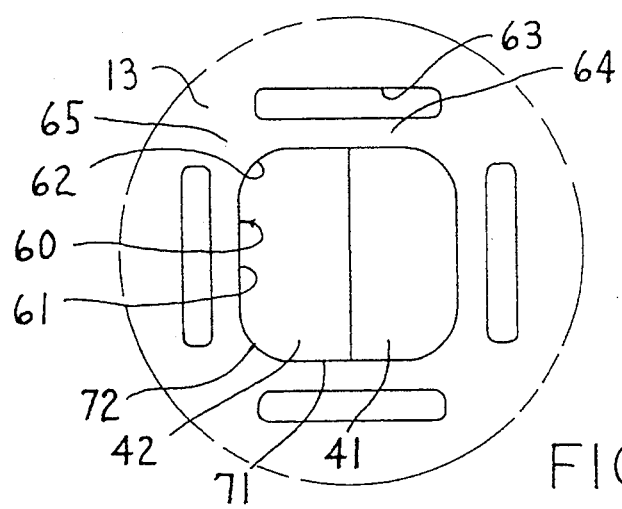

In the assembled holder 10 the base panel hinge pins 16 and the clamp member composite pins 41, 42 snugly fit within corresponding ones of the pivot holes 60, as seen for example in FIGS. 7, 12 and 15. Extending parallel to each side edge 61 of the hole 60 is an elongate, preferably round ended, slot 63. Each slot 63 is radially spaced from its hole side edge 61 by a relatively thin and thereby resiliently bendable, perimeter portion 64, hereafter referred to as a resilient leaf. In the embodiment shown, the radial thickness of the leaf 64 and slot 63 are substantially the same. The length of each slot 63 is less than the minimum width (across the flats) of the hole 60 but slightly exceeds the chordal length of the flats 61 of the hole 60 such that the ends of the slots partly overlap the rounded corners 62 of the hole 60. The circumferential distance between the ends of adjacent slots 63 substantially exceeds the thickness of the slots 63 and leaves 64, and indeed in the embodiment shown exceeds the combined thickness of a slot 63 and adjacent leaf 64, so as to strengthen the back panel side 13 in the area 65 circumferentially between the ends of adjacent slots 63 and the adjacent rounded corners 62 of the hole 60, and thus between the adjacent ends of adjacent leaves 64. The thus strengthened ends of the leaves 64 thus do not rip apart if the central portions of the adjacent leaves are distorted radially outward in the manner shown in, and hereafter described with respect to, FIG. 16. In the preferred embodiment shown the back member sides are about 0.09 inch thick, the back member 11 in total is about 0.88 inch thick, the minimum width of each hole 60 is about 0.22 inch, the radius of the rounded corners 62 is about 0.05 inch, the length of each slot 63 is about 0.18 inch and the radial thickness of each slot 63 and leaf 64 is about 0.03 inch.

Figure 16:
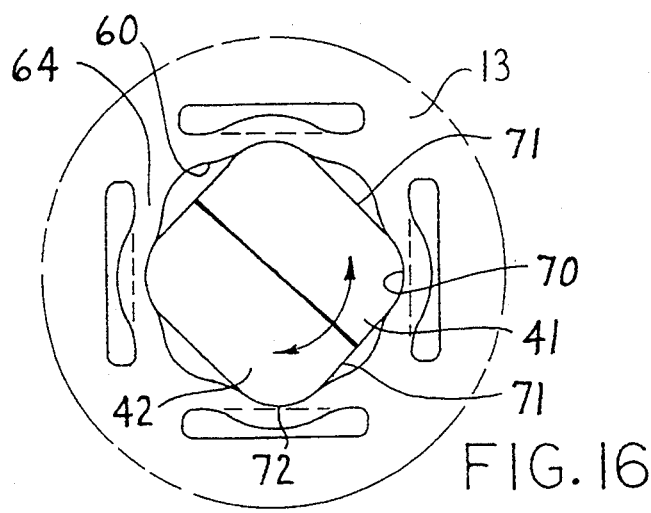
FIG. 16 is a view similar to FIG. 15 but showing the hinge pin in an intermediate pivoted position, namely intermediate the open and closed position of the clamp member, or base panel.

Each pin 16 and composite pin 41, 42 has, in the preferred embodiment shown, a substantially square cross-section, like that of the holes 60, comprising convexly rounded corners 70 circumferentially separating chordal flats 71 (FIG. 16). The cross-section of the pin 16 and composite pins 41, 42 is shaped and sized to fit snugly within the corresponding holes 60, as indicated in FIG. 15. In the preferred embodiment shown, the pins 16 and composite pins 41, 42 have a width across the flats of about 0.22 inch and have rounded corners 72 of about 0.05 inch radius. The corners 62 of the holes 60 could be less rounded (more square), particularly less rounded than the corners 72 of the pins 16 and composite pins 41, 42. However, it is satisfactory and indeed, to strengthen the zones 65, best if the hole corners 62 are of about the same radius as the pin corners 72.

Figure 14:
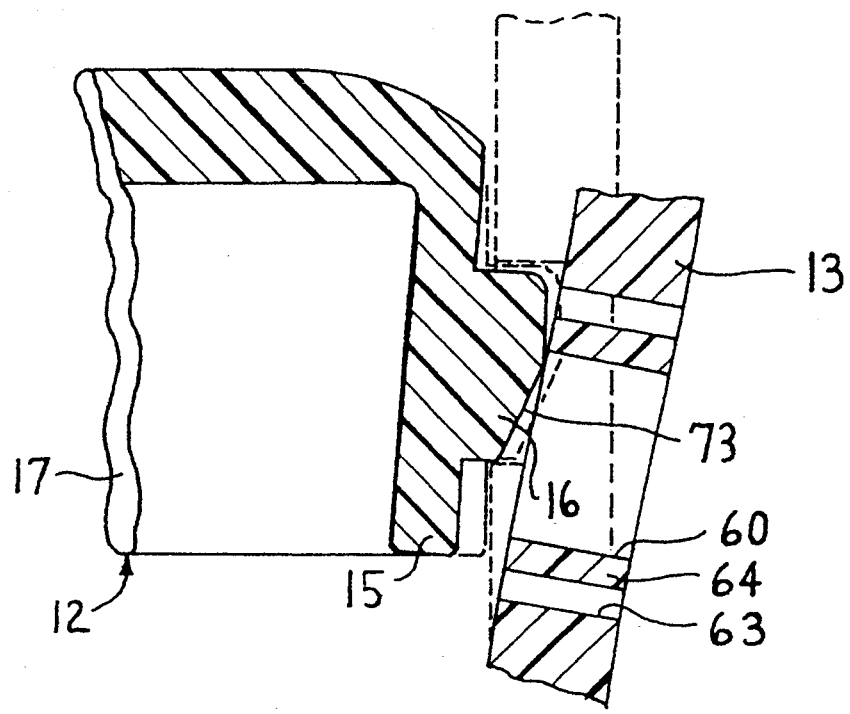
FIG. 14 is an enlarged, partially broken, fragment of the rightward portion of the base member of FIG. 13 showing its hinge pin partly inserted into the corresponding opening in the opposed side of the back member.
Figure 13:
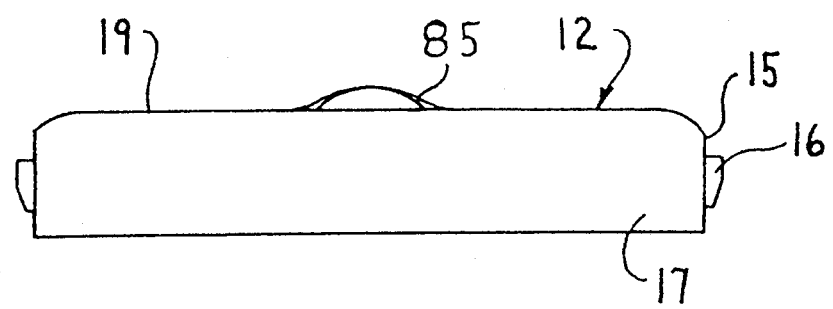
FIG. 13 is a bottom view of the base member, substantially taken on the line 13—13 of FIG. 6.

The pins 16 and composite pins 41, 42 are installable in the corresponding holes 60 in the back panel sides 13 by pressing the corresponding base panel 12 or clamp member 20, while disposed parallel to the back panel 11, rearwardly into the open front of the box-like back panel 11 and toward the back wall 14 thereof. Such rear pressing of the pins 16 bends the base panel sides 15 inwardly and back panel sides 13 outwardly, (as generally indicated in FIG. 14) until the pins 16 resiliently snap fit into the corresponding holes 60 (see the transition from FIG. 14 to FIG. 12, for example). Such rear pressing of the composite pins 41, 42 similarly bends the H-member 30 and bends outwardly the back panel sides 13 (like in FIG. 14) until the composite pins 41, 42 resiliently snap into their corresponding holes 60. It will be understood that the base panel 12 and clamp member 20 are sequentially, not simultaneously, thus installed on the back panel 11.

To facilitate entry of the pins 16 or composite pins 41, 42 into the corresponding holes 60, the back edges 73 (FIG. 14) of the pins 16 and back edges 74 of the half pins 42 are preferably chamfered, as respectively indicated in FIGS. 14 and 12. To facilitate snap fitting of the pins into the holes, the length (for example, 0.10 inch) of the pins is preferably somewhat less than the thickness (for example, 0.12 inch) of the back panel sides 13 (less than the depth of the holes 60).

Once installed in their respective holes 60, the pins 16 and composite pins 41, 42, by reason of the abutment of their flats 71 along the corresponding flats 61 of the holes 60, positively hold the base panel 12 and clamp member 20 in either of their respective FIG. 1 forwardly extending position and FIG. 9 folded position or, if desired, a forward base panel position in combination with a folded clamp member position. Rotation of the base panel 12 and clamp member 20 from one of the these positions to the other is resiliently resisted by reason of the fact that the maximum diameter of the pins 16 and composite pins 41, 42, diagonally across the rounded corners thereof, exceeds the distance across the flats 61 of the hole 60. However, upon application of a modest circumferential force (torque) to the base panel 12 or clamp member 20, the corresponding pins 16 or composite pins 41, 42 can be rotated from their FIG. 15 position to their FIG. 16 position by resilient radially outward bending of the central portion of the leaves 64 into the slots 63 as seen in FIG. 16. In the particular embodiment shown in FIG. 16, it will be seen that the pins and holes are sized such that the leaves 64 have their central portions resiliently bent outward to the extent of two-thirds the width of the adjacent slots 63, at maximum, as the corresponding corners 72 of the pins rotate therepast, in the central portion of their rotation between end positions (of FIGS. 1 and 9). Thus, the pin-in-hole structure above discussed with respect to FIGS. 15 and 16, without reliance on assistance furnished by the leaf spring-like elements 21 above discussed, fixes, in a stable yet resiliently changeable manner, the base panel 12 and clamp member 20 in their respective forwardly extending use positions of FIG. 1 and in their non-use, folded positions of FIG. 9.

The elements of the holder 10 are preferably of a molded plastics material, such as polypropylene or nylon, which has a substantially rigid nature but is capable of a modest degree of bending, sufficient to enable insertion of the pins 16 and composite pins 41, 42 into their respective holes 60 as generally shown in FIG. 14 and also sufficient to permit rotation of the pins 16 (and composite pins 41, 42), as generally indicated with respect to FIGS. 15 and 16.

In the preferred embodiment shown, the leaf spring-like elements 21 are preferably molded into the back wall 14 (FIGS. 8 and 9) of the back panel 11, leaving narrow, U-shaped clearance slots 77 in the back wall 14. This simplifies manufacture in that the leaf spring-like elements can be formed in the same molding operation as is the back panel and no separate parts are required to comprise the leaf spring-like elements 21 or mount them on the back wall 14 of the back panel 12. Further, by appropriate configuration of the mold, it is possible to fix the innermost ends of the leaf spring-like elements 21 to the central portion of the back wall 14 and to provide the leaf spring-like elements 21 with the shallow Z-shaped cross section shown for example in FIG. 9.

As seen in FIGS. 4 and 9, the free end portions of the leaf spring-like elements 21 bear flatly against the back faces of the base panel 12 and clamp member 20 to assist in holding same in their forwardly extending FIG. 4 use positions and FIG. 9 folded positions. Further, pivoting of the base member 12 or clamp member 20 (the FIG. 5 example being the clamp member 20) is resiliently resisted by rearward flexing of the leaf spring-like members 21 by sliding contact thereon of the rounded corner 75 of such base panel 12 or clamp member 20 as it pivots through the intermediate position shown in FIG. 5, between its folded and forwardly extending use positions. The shallow Z-shaped, leaf spring-like elements 21, in their relaxed positions, have the free ends thereof displaced forwardly of the plane of the back wall 14. This avoids, during pivoting therepast of the base panel 12 and clamp member 20, displacing the leaf spring-like member 21 rearwardly behind the back wall 14 of the back panel. Thus, if desired, the back wall 14 of the back panel 11 could be mounted directly against a supporting surface, without interference with the action of the leaf spring-like elements 21 and despite the fact that the leaf spring-like elements 21 are open to the space behind the back wall 14.

Rather than mounting the holder 10 with the back wall 14 against an upstanding supporting surface, the inventive holder 10 is preferably arranged for substantial flush mounting with respect to such an upstanding supporting surface 22 (FIG. 7). More particularly, the shallow box-like, forwardly opening, back panel 11 has a radially outwardly extending, front perimeter flange 76 (FIGS. 1 and 7). Thus, the back panel 11, except for its perimeter flange 76, can be fully recessed into an opening 80 (FIG. 8) in the supporting surface 22, so that the flange 76 rests against the front of the supporting surface. The holder 10, and more particularly its base panel 12, can be fixed with respect to the supporting surface 22 by means of one or two pairs of obtusely angled, generally L-shaped brackets 82 (FIG. 3). More particularly, screws or bolts 23, extending rearwardly through the countersunk holes 24 in the back wall 14, threadedly engage inner legs 83 (FIGS. 3 and 17) of the L-shaped brackets 82, while the free ends of the inner legs 83 rest against the back of the back wall 14 and the free ends of the outer legs 84 of the brackets 82 rest against the back of the vehicle support surface 22, thereby clamping the vehicle support surface 22 between the brackets 82 and flange 76 in a rigid manner as seen in FIG. 3, to thereby fix the holder 10 to the support surface 22.

Figure 6:
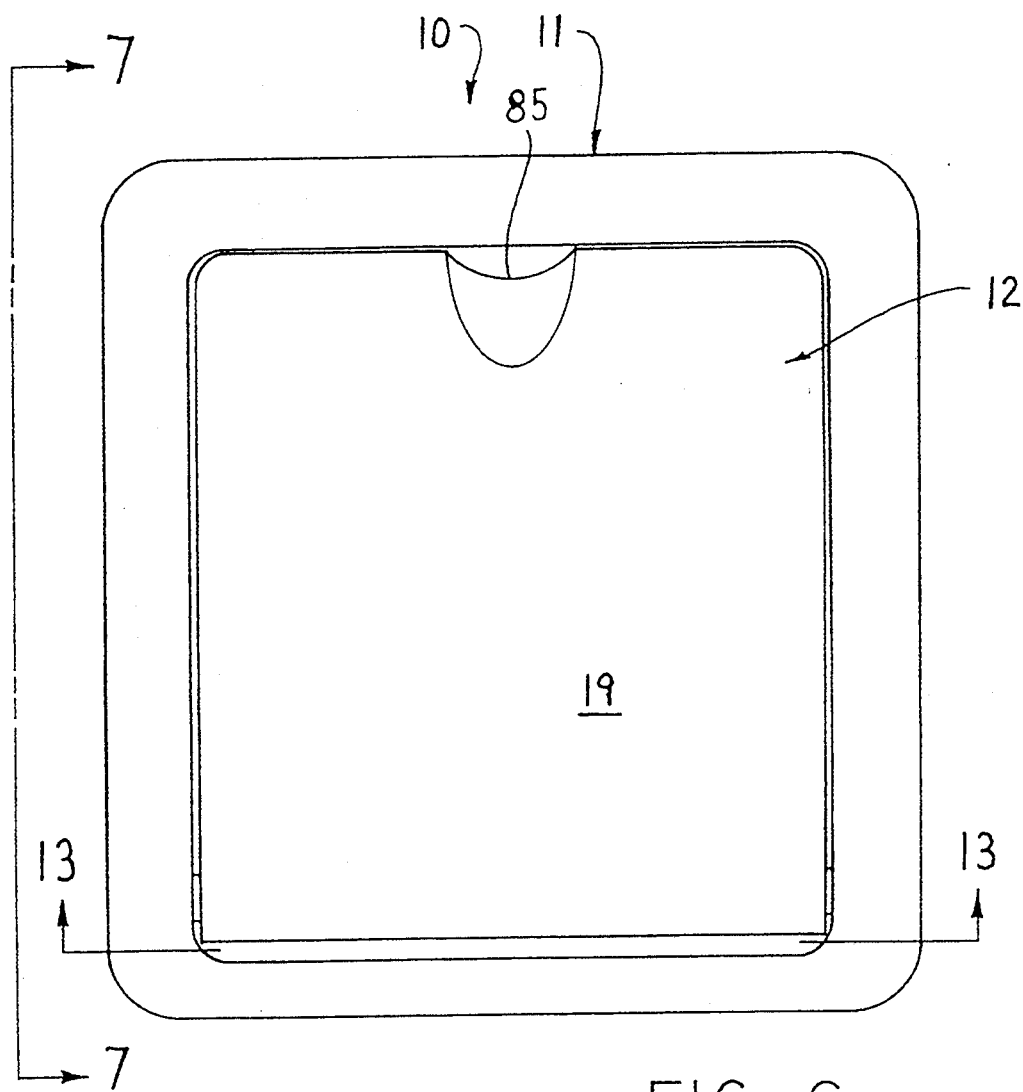
FIG. 6 is a front view of the FIG. 1 apparatus in its closed position.

In the preferred embodiment shown, both the base panel 12 and clamp member 20 recess within the forwardly opening cavity of the back panel 11. Thus, with the apparatus folded as seen in FIGS. 6 and 9, the flange 76 provides a "picture frame" entirely surrounding the closed base panel 12, resulting in a particularly appealing, neat finished appearance. The front wall 19 of the closed base panel 12 is substantially flush with the front of the perimeter flange 76 of the back panel 11, to enhance the flush mounted appearance of the holder 10. In view of the co-planar front surfaces of the folded base panel 12 and perimeter flange 76, the top of the folded base panel front wall 19 is provided with a finger grip 85 having a shallow, upwardly concave depression and a forwardly and upwardly sloped protrusion from the front wall, wherein a finger of the user upon the finger grip 85 can pull downward and forward the pivoted base panel, from its closed position to its open position as shown in FIG. 4. This finger grip 85 thus effectively bifurcates the front flange 18 of the base panel 12.

Also, the sides 15 of the base panel 12 preferably taper forwardly to virtually zero height, to eliminate any tendency of interference with the clamp member 20 as the base panel 12 folds to its closed FIG. 9 position.

OPERATION

The holder 10 is quickly assembled by inserting the mounting portions 44 of the arms 43 into the guide openings 38 in the open, FIG. 10 condition of the latter. The openings 38 are then closed by pressing together the half pins 41 and 42 at the ends of the H-shaped member 30. The half pins 41 and 42 are then snapped into the upper pivot holes 60 in the sides 13 of the back panel 11 as indicated in FIG. 12. In a similar manner, the pins 16 of the base panel, or cover, 12 are snapped into the lower holes 60 in the sides 13 of the back panel 11, as indicated in FIG. 14.

Such snapping in of the pins 16 is assisted by the slight flexing of the sides 13 and 15 of the back panel 11 and base panel 12, respectively, as seen in FIG. 14, as well as by the beveled leading edge 73 of the pins 16. Similarly, the snapping of the composite pins 41, 42 into their holes 60 in the back panel sidewalls 13 is facilitated by a similar slight flexing of the sidewall 13 (much as in FIG. 14) as well as bending, transverse to its length, of the H-shaped member 30 in a manner not shown, and further by the beveled leading edge 74 of the composite pins 41, 42. Such snapping in of both the pins 16 and the composite pins 41, 42 is further facilitated by the relatively short length of such pins, which is selected to minimize the amount of flexing of members needed to obtain such snapping in of the pins into their holes 60, and yet prevent accidental dislodgement of the pins 16 and 41, 42 from their holes 60. The beveled edges 73 and 74 are located to facilitate such snapping in by rearward pressing of the clamp member 20 and cover 12, one at a time, from a position in front of and parallel to the back panel back wall 14.

Once assembled as above discussed, and with the holder in its folded condition of FIG. 9, same provides a compact configuration for shipping.

If desired, the holder 10 can be simply surface mounted by fastening (for example by screws or other suitable fastening means) with its back panel 14 abutting the front of a suitable upstanding mounting surface and with the entirety of the holder 10 projecting forward from such mounting surface.

However, it is preferred and more elegant to flush mount the holder 10 as generally indicated in FIG. 7 with respect to the support surface 22. In this mounting arrangement, an opening 80 is provided in the supporting surface 22. The opening 80 is sized and shaped to freely receive the rearward portion of the box-like back panel 11 but be covered by the back panel front perimeter flange 76, so that the holder 10, except for the perimeter flange 76 and the finger grip 85 (FIG. 7) is substantially flush with the front of the upstanding mounting surface 22. This recesses most of the folded holder 10 behind the front face of the upstanding mounting surface 22. In the preferred embodiment shown, the closed cover 12 is flush with the perimeter flange 76 and the outer edges of the perimeter flange are rounded and/or beveled, as indicated at 86 in FIG. 7. Thus, the helmsman or crew moving rapidly in the cockpit of a sailing boat may accidentally brush across the folded holder 10 installed, for example, in the upstanding back surface of a cockpit seat, without snagging the folded holder 10 and thus without either impeding his or her movement or damaging or pulling loose the folded holder 10.

The folded holder may be held in its recessed installed position of FIG. 7 by screwing or adhesively bonding the flange 76 to the front of the mounting surface 22 in a manner not here shown, or may conveniently, particularly when access to the area behind the mounting surface 22 is available, be fixed to the mounting surface 22 by the brackets 82 (FIGS. 3 and 7). The brackets are readily installed by threading the screws 23 into the inner legs 83 of the brackets while the outer legs 84 thereof bear on the mounting surface 22. The tightening of the screws thus presses the brackets 82 and back wall 14 of the back panel toward each other to press the bracket outer legs 84 toward the perimeter flange 76 to tightly and fixedly grip the mounting surface 22 therebetween.

Once thus installed on an upstanding mounting surface 22, the closed (FIGS. 6 and 7) holder 10 can be opened for supporting a beverage container, by first gripping the cover finger grip 85 (FIG. 7) and pulling same forward and downward to pivot the cover 11 approximately 90° downward into its forward extending position of FIGS. 1–4. Then the user can pivot upward and forward, from its closed FIG. 7 position to its forward extending use position of FIGS. 1–4, the clamp member 20. Note that a return to the FIG. 6, 7 folded condition of the holder is accomplished by reversal of these movements.

The cover, or base panel, 12 and clamp member 20 are positively but resiliently fixed in both their FIG. 6, 7 stowed position and in their forward extending, FIG. 1–4 use position, by engagement of their respective substantially square pins 16 and composite pins 41, 42, flat to flat with the square perimeter of the holes 60 in the back panel sides 13 as generally indicated in FIGS. 1, 7 and 15.

In the embodiment shown, the molded-in, cantilevered leaf springs 21 (FIGS. 9 and 4) preferably abut cover back flange 17 and the adjacent portion of the clamp member 20 to resiliently assist in fixing the cover 12 and clamp member 20 in both their folded and open positions. During opening and closing pivoting of the clamp member 20 and cover 12, the leaves 64 around the pivot holes 60 are deflected radially outwardly by the passing rounded corners 72 of the pins 16 and composite pins 41, 42, thereby requiring a sufficient positive manual application of pivoting force to the cover 12 and clamp member 28 to pivot same out of their resiliently fixed closed and open positions of FIGS. 9 and 7. This effect can be, and in the preferred embodiment shown is, assisted by deflection of opposed ones of the cantilevered leaf springs 21 of the back panel back wall as illustrated by the rearward deflection of such a cantilevered leaf spring 21 by the corner 75 of the clamp member 20 as seen in FIG. 5. Though not specifically shown on the drawings, it will be seen that the free edge of the cover back flange 17 would likewise deflect the opposed cantilevered leaf springs 21 in pivoting between the open and closed cover positions of FIGS. 4 and 9.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An article holder mountable on an upwardly extending surface, said holder comprising:
   a back panel adapted to be fixed with respect to an upwardly extending surface;
   a base panel moveable with respect to said back panel between an open position extending outwardly from said back panel and a closed position overlying said back panel;
   a clamp member for engaging and holding a beverage container, said clamp member being moveable with respect to said back panel for pivotal movement between a storage position between the closed base panel and said back panel and an erected position extending outwardly from said back panel and spaced from the open position of said base panel;
   hinge means for pivotally supporting a movable member with respect to said back panel, said moveable member constituting at least one of said base panel and clamp member, said hinge means comprising a pin-rotatable-in-hole means for pivotally supporting said moveable member for rotation about a rotational axis with respect to said back panel, said pin-rotatable-in-hole means comprising pin means on one of said moveable member and back panel and hole means on the other of said moveable member and back panel, at least of one of said pin means and hole means having means associated therewith and interactive with the other of said pin means and hole means for positively holding said moveable member in a first position with respect to said back panel and for resiliently distorting in response to forcible manual pivoting of said moveable member with respect to said back panel about said rotational axis for pivoting of said moveable member out of said first position and toward a second position with respect to said back panel, said pin means comprising a pin and said hole means comprises a hole for receiving said pin, said resiliently distorting means comprising a radially resiliently distortable means on a perimeter of one of said pin and hole, protruding means on the perimeter of the other of said pin and hole and engageable with said resiliently distorting means for resiliently distorting same and thereby for allowing rotation of said pin with respect to said hole.

2. The apparatus of claim 1 in which said moveable member is said base panel and said first position is at least of one of said open position and closed position of said base panel.

3. The apparatus of claim 2 in which said open position constitutes one said first position and said closed position constitutes a second said first position, said second position being intermediate between said open and closed positions of said base panel.

4. The apparatus of claim 1 in which said moveable member is said clamp member and said first position is one of said storage position and erected position of said clamp member.

5. The apparatus of claim 4 in which said storage position is one said first position and said erected position is a second said first position and said second position is intermediate said storage and erected positions.

6. The apparatus of claim 1 in which said resiliently distorting means comprises a chordally disposed resilient leaf at the perimeter of said hole, said pin having a radial protrusion rotatable into engagement with said resilient leaf for pushing said resilient leaf radially outward sufficient to allow rotation of said protrusion there past, said protrusion defining said protruding means.

7. The apparatus of claim 6 in which said pin has a perimeter which includes first and second flats flanking said protrusion and alternatively opposable radially to said chordal leaf to hold said moveable member in said first position.

8. The apparatus of claim 1 in which said pin has a plurality of circumferentially spaced flats, said hole having a perimeter with a corresponding plurality of circumferentially spaced flats, said pin being rotationally fixed with one of its flats opposing a corresponding flat on the perimeter of said hole, slots parallel to and close spaced radially outward from said flats of said hole to define between each said slot and said hole a resilient leaf resiliently outwardly deflectable to permit rotation of said pin and said hole, said leaf defining said resiliently distorting means.

9. The apparatus of claim 8 in which several said slots are circumferentially spaced end to end around said hole and the circumferential length of a given slot approximates the length of the corresponding flat of said hole.

10. An article holder mountable on an upwardly extending surface, said holder comprising;
a back panel adapted to be fixed with respect to the surface;
a base panel moveable with respect to said back panel between an open position extending outwardly from the back panel on a closed position overlying said back panel;
a clamp member for engaging and holding a beverage container, said clamp member being moveable with respect to said back panel for pivotal movement between a storage position between the closed based panel and said back panel and an erected position extending outwardly from said back panel and spaced from the open position of said base panel, said back panel having a side opposing at least one of said based panel and clamp member, a moveable member defined by at least of one of said base panel and clamp member, a pin protruding from said moveable member towards said side and means defining a hole in said side and rotatably receiving said pin therein, said pin and hole being of substantially square, corresponding cross-section defined by circumferentially alternating facets and corners, said corners of the square cross-section of at least said pin being relieved, means defining slots through said side parallel to and close spaced radially outward from said facets of the square cross-section of the hole, each said slot and the radially opposed facet of the hole defining therebetween a resilient, chordally extending leaf having at least a central portion resiliently deflectable outwardly to permit but resiliently resist rotation therepast of a said relieved corner of said pin, said leaves cooperating to tend to positively locate said pin in either of at least two circumferential orientations spaced at 90° circumferentially from each other but to permit rotation of said pin in said hole given a sufficient torque on said pin to deflect said leaf radially outward into said radially opposed slot.

11. The apparatus of claim 10 in which said movable member comprises said clamp member, said clamp member having a pair of said pins extending axially in opposite directions therefrom into corresponding ones of said holes in corresponding ones of said sides of said back panel for positively locating said clamp member in said storage and erected positions thereof and resiliently permitting rotation of said clamp member back and forth between said positions.

12. The apparatus of claim 10 in which said movable member comprises said base panel, said base panel having oppositely extending ones of said pins rotatable in opposed ones of said holes in opposite ones of said sides of said back panel for positively locating said base panel in its open and closed positions and resiliently permitting pivoting of said base panel back and forth between said positions.

13. The apparatus of claim 10 in which said back panel has a back wall behind and opposing said movable member, a substantially U-shaped cut in said back wall leaving a cantilevered, leaf spring-like, segment of said back wall in leaf spring-like engagement with an adjacent opposed portion of said movable member, said movable member being supported by an opposed pair of said pins engageable in corresponding holes in laterally opposed sides on said back panel, said spring-like back wall segment cooperating with said pins and holes to positively locate said movable member in alternate fixed positions and further cooperating therewith for resiliently permitting pivoting of said movable member between such fixed positions.

14. A beverage container holder mountable on an upstanding surface, said holder comprising:
a back panel mountable fixedly on an upstanding surface and having an upstanding back wall and laterally opposed sides, and holes in said sides and laterally opposed across said back panel;
a beverage container engaging pivoting member extending between and pivotally mounted with respect to said holes, said pivoting member having a stowed position in which it folds parallel to said back wall and an alternate beverage container stabilizing position in which it extends forward from said back wall;

said back panel being a molded member and having molded therein a plate-like, resiliently bendable leaf, at least one end of said leaf being integrally connected with said back panel, said leaf having ends connected by side edges and side faces, said side edges and side faces being resiliently movable with respect to said back panel, said side faces being resiliently bendable;

said pivoting member having angled first and second faces substantially rigidly connected by a corner, said pivoting member in its said stowed position having its first face pressed flat against said leaf, and in its beverage container stabilizing position having its second face pressed flat against said leaf to maintain said pivoting member reliably fixed alternatively in said stowed and beverage container stabilizing positions, said pivoting member having a position intermediate said stowed and beverage container stabilizing positions in which its said corner forcibly depresses said leaf out of its way so said pivoting member can pivot between its said stowed and beverage container stabilizing positions, said pivoting member having laterally outwardly extending pins pivotable in said holes for pivoting of said pivoting member between said stowed and stabilizing positions, said pins having angled, circumferentially spaced flats connected by said corner and constituting said angled first and second faces, said leaf chordally bounding a portion of at least one of said holes, a slot through said back panel side, said leaf separating said slot from said hole, said leaf being fixed at its opposite ends integrally with the corresponding side of said back panel, a middle portion of said leaf being resiliently bendable by said corner as said corner with said pivoting member pivots, whereby engagement of said pin in said hole resiliently resists movement of said pivoting member between its stowed and beverage container stabilizing positions.

15. The apparatus of claim 14 in which said pins are substantially square in cross section, each having four said corners connected circumferentially by four said flats, said corners being rounded convexly to facilitate sliding on and depressing said middle portion of said leaf, said holes each having four circumferentially distributed ones of said leaves so as to be substantially square in shape, said holes being surrounded by four circumferentially spaced ones of said slots, said corners, faces, leaves and slots being distributed circumferentially substantially at 90° intervals.

16. The apparatus of claim 15 in which said slots and leaves have a thickness of about one-seventh the minimum width of said holes, the minimum width of said pins and holes being about the same so that said pins fit snug in said holes in the stowed and beverage container stabilizing positions of said pivoting member.

17. The apparatus of claim 16 in which said pivoting member has a back edge portion from which said pins extend endwise and which extends between said sides of said back panel, said back edge portion of said pivoting member also having angled further first and second faces connected by a further corner, said further first and second faces and corner extending laterally with respect to said back panel substantially from side to side thereof, at least one further said leaf, said further leaf being molded integrally with the back wall of said back panel the integrally connected end of said further leaf being located near the center of said back panel, the remainder of said further leaf extending from the central portion of said back panel toward one of a top or bottom edge thereof, said beverage container engaging member being located adjacent said one back panel edge, said further leaf having its remaining end free of said back panel, said laterally extending back edge portion of said pivoting member being positionable alternatively with its first and second faces and corner against said free end of said further leaf for holding said pivoting member reliably fixed in its alternative stowed and beverage container stabilizing positions yet resiliently permitting pivoting of said pivoting member from one said position to the other by bending of said further leaf by said corner of said back portion of said pivoting member, such that engagement of said pins in said holes cooperates with engagement of said further leaf on the back portion of said pivoting member to maintain said pivoting member reliably fixed alternately in its stowed and beverage container stabilizing positions yet resiliently permit said pivoting member to be forcibly pivoted from one of said stowed and stabilizing positions to the other.

18. The apparatus of claim 17 in which said holder has two said pivoting members, one of said pivoting members comprising a pair of arms slidable toward and away from each other for accommodating the width of differently sized beverage containers and which is located adjacent the top of said back panel for folding downward into a forward opening interior of said back panel, the other of said pivoting members comprising a cover pivoted adjacent the bottom of said back panel and pivotable upwardly to a position flush with the front of said back panel to cover the folded arms and enclose same between said cover and said back wall of said back panel, said back panel being shaped as a substantially rectangular, forwardly opening box of shallow depth and having a planar front flange along the front thereof so that the sides and back wall of said back panel can be recessed in an upstanding surface, with said front flange bearing on the front of such upstanding surface and such that said holes, pins and further leaf are all behind said front flange and hence hidden by said front flange and upstanding surface when the holder is installed in such upstanding surface.

* * * * *

UNITED STATES PATENT AND TRADEMARK OFFICE
CERTIFICATE OF CORRECTION

PATENT NO. : 5 423 508
DATED : June 13, 1995
INVENTOR(S) : Steven R. ISENGA, et al It is certified that error appears in the above-indentified patent and that said Letters Patent is hereby corrected as shown below:

Column 12, line 65; after "engaging" insert ---,---.

Signed and Sealed this

Seventeenth Day of October, 1995

Attest:

BRUCE LEHMAN

*Attesting Officer*            *Commissioner of Patents and Trademarks*